No. 655,504. Patented Aug. 7, 1900.
J. MORRIS.
FEED RACK.
(Application filed May 18, 1900.)
(No Model.)
Fig. 1.
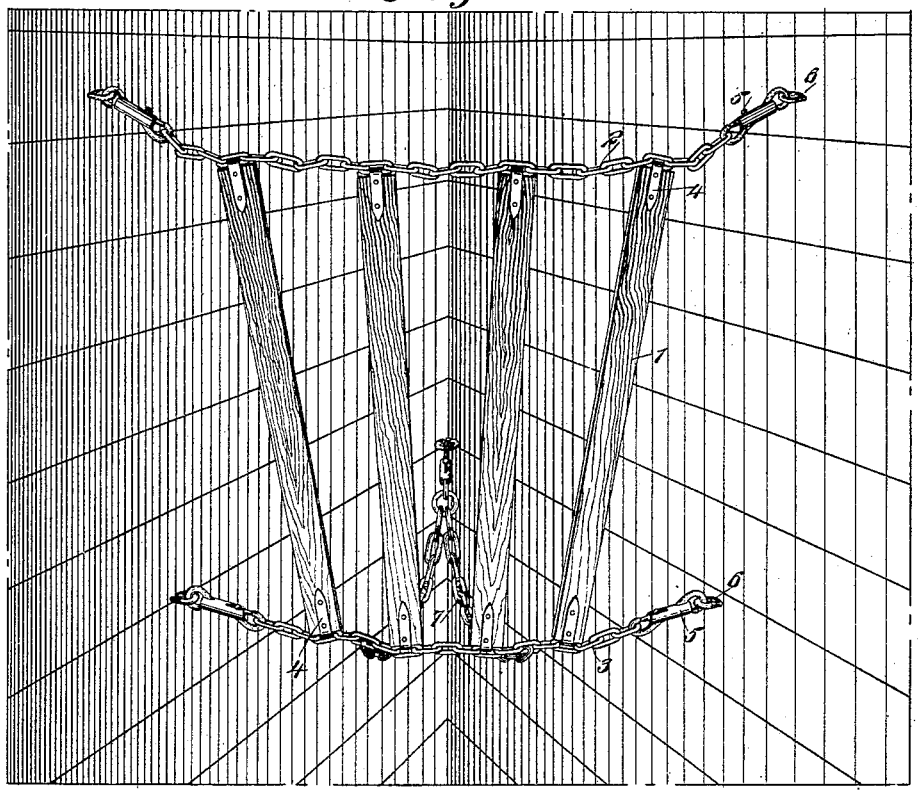
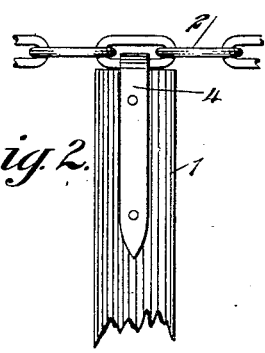
Fig. 2.
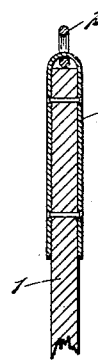
Fig. 3.
WITNESSES:
INVENTOR
James Morris.
BY
ATTORNEYS
THE NORRIS PETERS CO., PHOTO-LITHO., WASHINGTON, D. C.

UNITED STATES PATENT OFFICE.

JAMES MORRIS, OF NEW YORK, N. Y.

FEED-RACK.

SPECIFICATION forming part of Letters Patent No. 655,504, dated August 7, 1900.

Application filed May 18, 1900. Serial No. 17,121. (No model.)

*To all whom it may concern:*

Be it known that I, JAMES MORRIS, a citizen of the United States, and a resident of the city of New York, (Westchester,) in the borough of Bronx, county of New York, and State of New York, have invented a new and Improved Feed-Rack, of which the following is a full, clear, and exact description.

This invention relates to improvements in feed or hay racks for horses; and the object is to provide a rack of very simple and comparatively-inexpensive construction that may be quickly and easily put up in a stall and as easily taken down and folded for transportation, thus particularly adapting the device for use in racing-stables, in which it is desirable that each horse shall have his own rack to avoid danger of contagious diseases that may be contracted from racks from which other or diseased animals have been fed.

I will describe a feed-rack embodying my invention and then point out the novel features in the appended claims.

Reference is to be had to the accompanying drawings, forming a part of this specification, in which similar characters of reference indicate corresponding parts in all the figures.

Figure 1 is a perspective view of a feed-rack embodying my invention and showing the same as placed in a stall. Fig. 2 is a face view of a portion of one of the rack-bars and support employed, and Fig. 3 is a section thereof.

The rack comprises a series of spaced bars 1, which are divergent from the bottom upward and are connected together at the top by a flexible connection, here shown as a chain 2, and at the bottom by a flexible connection or a chain 3. As shown in the drawings, the chains are connected to the extreme ends of the bars by means of metal straps 4, riveted to the bars and passing through links of the chains. The ends of the chains are designed to be detachably connected to the walls of a stall. For this purpose I may employ snap-hooks 5, secured to the walls of the stall by means of eyes 6, or the hooks may be connected directly to the ends of the chains and engaged with eyes or staples placed in the walls of the stall. By placing the chains at the extreme ends of the bars and employing the strap-fasteners there can be no danger of the halter or bridle of a horse catching on the bars.

A bottom for the rack is formed by means of chains 7, attached at one end to the lower chain of the bars and at the other end to an eye arranged in a corner of the stall, as clearly indicated in Fig. 1.

It is obvious that a rack embodying my invention may be quickly placed in position or taken down and compactly folded with the blankets or other trappings of a horse for the purpose of transportation from one place to another and practically insure that each horse has his own individual rack.

Having thus described my invention, I claim as new and desire to secure by Letters Patent—

1. A feed-rack, comprising a series of bars, flexible connections for said bars at the top and bottom, means for attaching said flexible connections to the walls of a stall, and flexible devices at the lower end of the rack and adapted for connection to a wall of the stall to form a bottom for the rack, substantially as specified.

2. A feed-rack, comprising a series of bars, chains extending over and connecting the ends of said bars, means for detachably connecting the ends of the chains to the walls of a stall, and a chain or chains connected to the lower portion of the rack and adapted for connection to a wall of the stall and forming a bottom for the rack, substantially as specified.

In testimony whereof I have signed my name to this specification in the presence of two subscribing witnesses.

JAMES MORRIS.

Witnesses:
JNO. M. RITTER,
C. R. FERGUSON.